United States Patent
Xu et al.

(10) Patent No.: US 8,596,158 B2
(45) Date of Patent: Dec. 3, 2013

(54) SPEED REDUCING MECHANISM

(75) Inventors: Xiao-Ming Xu, Shenzhen (CN);
Zhen-Hua Xu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/303,385

(22) Filed: Nov. 23, 2011

(65) Prior Publication Data
US 2013/0042710 A1 Feb. 21, 2013

(30) Foreign Application Priority Data

Aug. 19, 2011 (CN) .......................... 2011 1 0239228

(51) Int. Cl.
*F16H 9/06* (2006.01)
(52) U.S. Cl.
USPC .......................................... 74/412 R; 74/640
(58) Field of Classification Search
USPC ........... 74/412 R, 413, 424.81, 640; 475/179, 475/177; 384/112, 407, 454, 455
See application file for complete search history.

(56) References Cited

U.S. PATENT DOCUMENTS

| | | | | |
|---|---|---|---|---|
| 4,174,621 A * | 11/1979 | Woltjen | ........................... | 464/36 |
| 4,379,976 A * | 4/1983 | Pitchford et al. | ............... | 310/83 |
| 4,512,213 A * | 4/1985 | Newton | ........................ | 475/179 |
| 4,646,587 A * | 3/1987 | Danel | ............................. | 74/640 |
| 4,825,727 A * | 5/1989 | Komuro | .......................... | 74/413 |
| 4,828,095 A * | 5/1989 | Kilwin | .......................... | 192/150 |
| 5,123,884 A * | 6/1992 | Kondoh et al. | ............... | 475/179 |
| 5,145,468 A * | 9/1992 | Nagabhusan | ................. | 475/170 |
| 5,292,289 A * | 3/1994 | Ogata et al. | .................... | 475/176 |
| 5,489,254 A * | 2/1996 | Lob | ............................... | 384/454 |
| 7,070,402 B2 * | 7/2006 | Ai et al. | ........................ | 418/61.3 |
| 7,073,948 B2 * | 7/2006 | Neder et al. | ................... | 384/447 |
| 7,552,664 B2 * | 6/2009 | Bulatowicz | ..................... | 74/640 |
| 7,575,377 B2 * | 8/2009 | Fick et al. | ..................... | 384/455 |
| 2010/0179013 A1 * | 7/2010 | Nakamura | .................. | 475/179 |
| 2011/0132495 A1 * | 6/2011 | Lajoie et al. | ................... | 144/4.1 |
| 2011/0156399 A1 * | 6/2011 | Tambe et al. | .................... | 290/55 |

* cited by examiner

*Primary Examiner* — David M Fenstermacher
*Assistant Examiner* — Zakaria Elahmadi
(74) *Attorney, Agent, or Firm* — Altis & Wispro Law Group, Inc.

(57) ABSTRACT

A speed reducing mechanism includes a speed reducer and a bearing engaged with the speed reducer. The speed reducer includes a driving member, a first transmission member and a second transmission member. The driving member is connected to the first transmission member. The first transmission member forms a plurality of first engaging teeth, and the second transmission member forms a plurality of second engaging teeth. The total number or count of the first engaging teeth is different from that of the second engaging teeth. The bearing includes a bearing cone, a bearing cup, and roller bearings mounted between the bearing cone and the bearing cup. The first transmission member is fixed to the bearing cup, and the second transmission member is fixed to the bearing cone.

15 Claims, 5 Drawing Sheets

SPEED REDUCING MECHANISM

BACKGROUND

1. Technical Field

The present disclosure generally relates to speed reducing mechanisms, and particularly to a speed reducing mechanism applied to a robot.

2. Description of Related Art

A common speed reducing mechanism includes a speed reducer, and a bearing sleeved on and engaged with the speed reducer. The speed reducer includes a driving member, a flexspline and a rigid circular spline. The bearing is generally sleeved on the flexspline and positioned between the flexspline and the rigid circular spline of the speed reducer. The bearing includes a bearing cone fixed with the flexspline of the speed reducer, a bearing cup fixed with the rigid circular spline, and a plurality of rollers mounted between the bearing cone and the bearing cup. In use, the existing speed reducing mechanism can only withstand a relatively small amount of torque, thus it is not suitable for application directed to a robot engaged in heavy lifting or highly strenuous-work.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
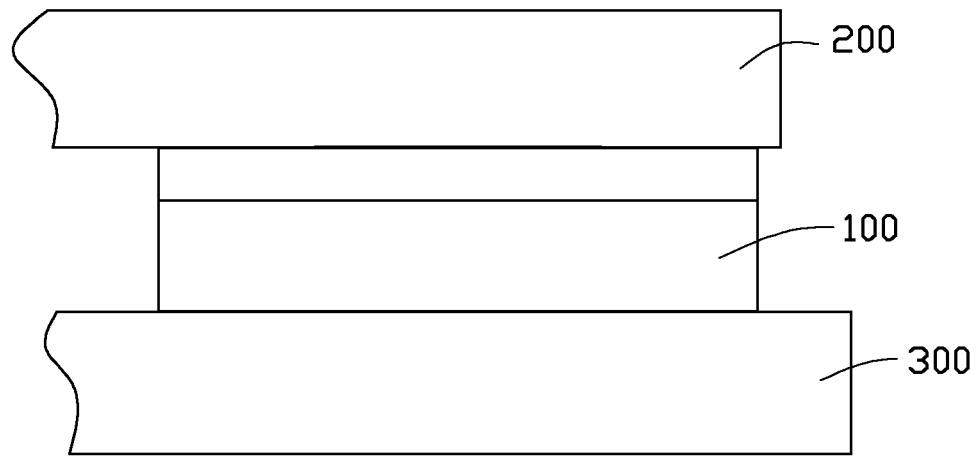
FIG. 1 shows an exploded schematic view of an embodiment of a speed reducing mechanism applied to connect a first robotic arm and a second robotic arm of a robot.
Figure 2:
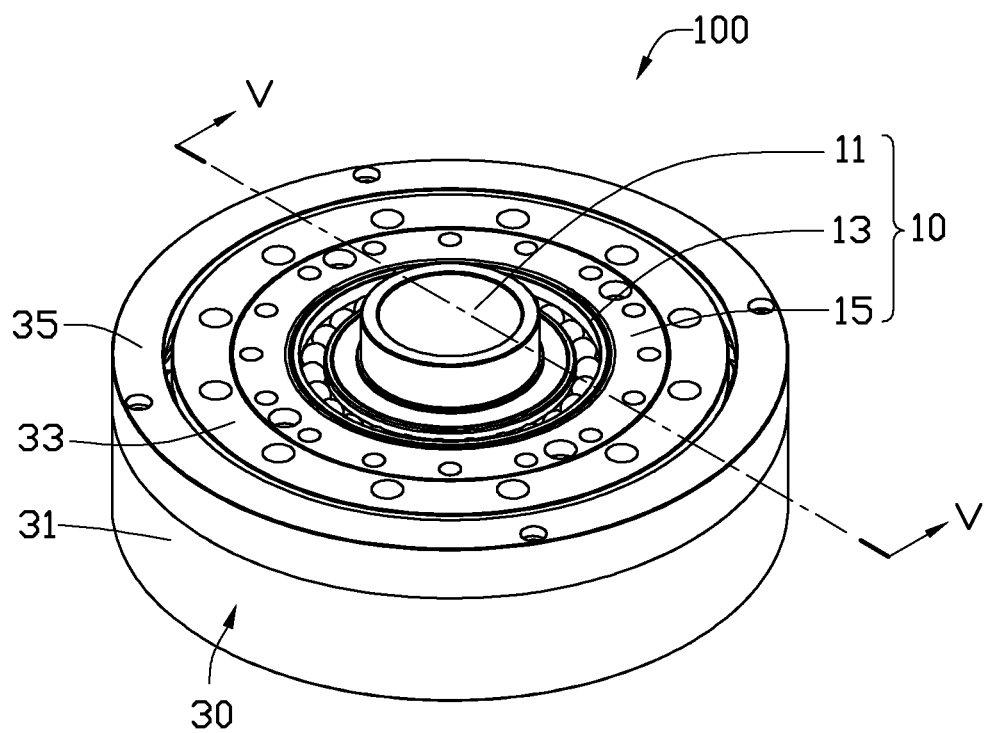
FIG. 2 shows an isometric view of the assembled speed reducing mechanism of FIG. 1.

Referring to FIGS. 1 and 2, an embodiment of a speed reducing mechanism 100 is applied to connect a first robotic arm 200 and a second robotic arm 300 of a robot (neither is shown), and is configured for transmitting the rotational energy of the first robotic arm 200 to the second robotic arm 300. The speed reducing mechanism 100 includes a speed reducer 10 and a bearing 30 engaged with the speed reducer 10. In the illustrated embodiment, the speed reducer 10 is a harmonic speed reducer assembled within the bearing 30. The speed reducer 10 includes a driving member 11, a first transmission member 13 assembled to the driving member 11, and a second transmission member 15 engaging with the first transmission member 13.

Figure 3:
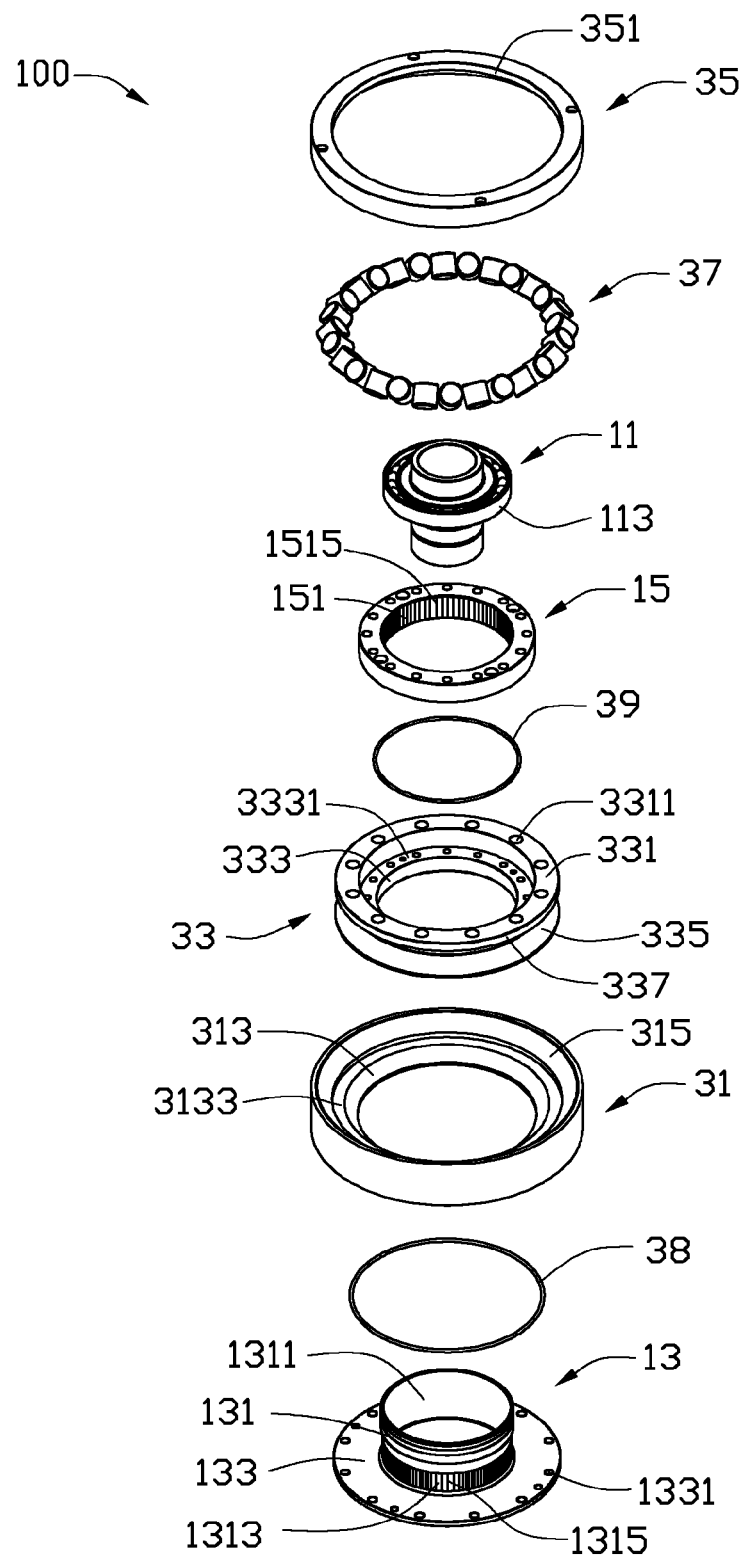
FIG. 3 shows an exploded isometric view of the speed reducing mechanism shown in FIG. 2.
Figure 4:
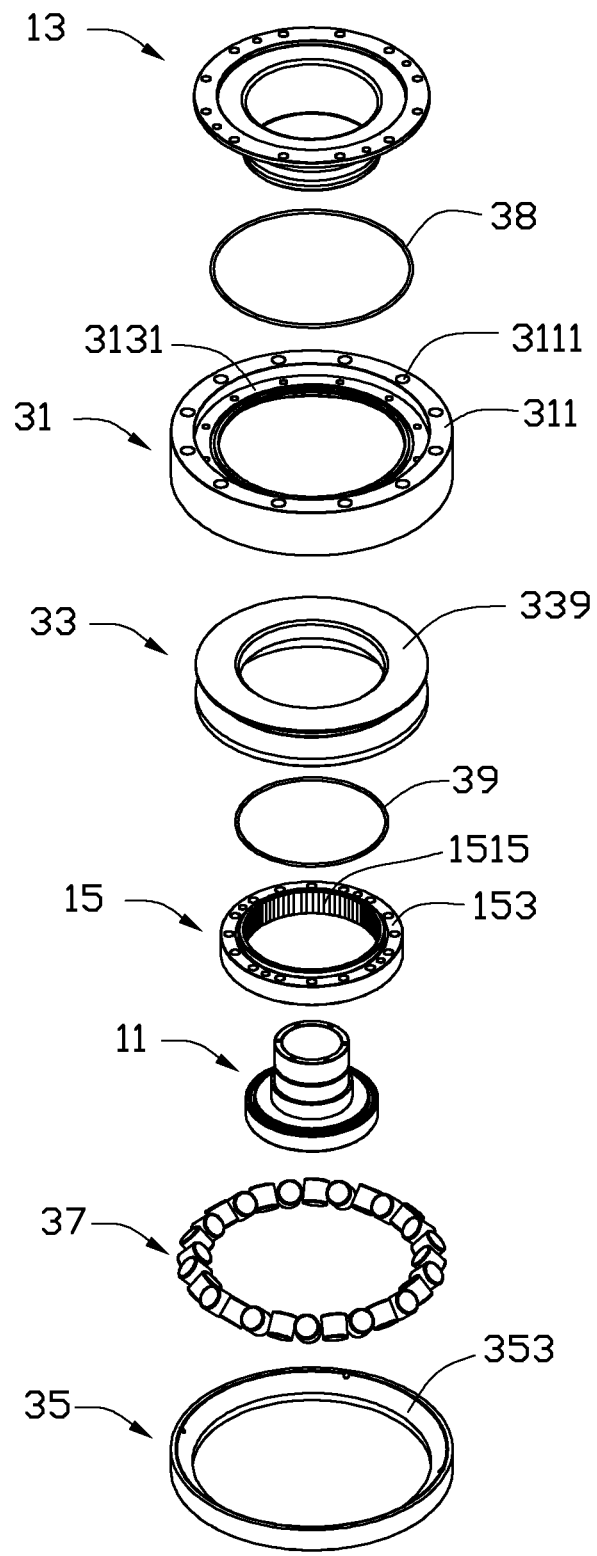
FIG. 4 is similar to FIG. 3, but viewed from another aspect.

Also referring to FIGS. 3 and 4, the driving member 11 is a harmonic wave generator, in the illustrated embodiment. The driving member 11 is a substantially stepped cylindrical body, and has a substantially cylindrical outer periphery 113. The first transmission member 13 is a flexspline, and is sleeved on the driving member 11. The first transmission member 13 includes a hollow cylindrical main body 131 and a flange 133 coaxially formed on one end of the main body 131. The main body 131 includes an inner peripheral wall 1311 and an outer peripheral wall 1313. The outer peripheral wall 1313 forms a plurality of first engaging teeth 1315. The flange 133 has an engaging surface 1331 adjacent to the main body 131.

The second transmission member 15 is sleeved on and engages with the first transmission member 13. In the illustrated embodiment, the second transmission member 15 is a rigid circular spline. The second transmission member 15 is substantially ring shaped, and includes an inner engaging wall 151 corresponding to the outer peripheral wall 1313 of the first transmission member 13, and an engaging end surface 153. The inner engaging wall 151 forms a plurality of second engaging teeth 1515. The total number or count of the first engaging teeth 1315 is less than that of the second engaging teeth 1515 of the second transmission member 15.

The bearing 30 is sleeved on and engages with the speed reducer 10. The bearing 30 includes a bearing cup 31, a bearing cone 33, an outer ring 35, a plurality of cylindrical rollers 37, a first sealing ring 38 and a second sealing ring 39. The bearing cup 31 is substantially ring shaped, and includes an assembling surface 311 positioned on an end surface of the bearing cup 31, a ring shaped latching protrusion 313 formed on an inner surface of the bearing cup 31, and a first inclined inner surface 315 opposite to the assembling surface 311. The assembling surface 311 defines a plurality of assembling holes 3111. The latching protrusion 313 includes a first latching surface 3131 adjacent to the assembling surface 311, and an opposite second latching surface 3133 adjacent to the first inclined inner surface 315 side. In the illustrated embodiment, the first latching surface 3131 and the second latching surface 3133 are both parallel to the assembling surface 311. The first inclined inner surface 315 is a circular conical surface positioned opposite to and away from the assembling surface 311. One end of the first inclined inner surface 315 connects with the latching protrusion 313, and the opposite other end of the first inclined inner surface 315 connects with a distal end of the bearing cup 31.

The bearing cone 33 is substantially ring shaped, and is assembled within the bearing cup 31. The bearing cone 33 includes a mounting end surface 331, an engaging end surface 339 opposite to the mounting end surface 331, a ring-shaped outer wall 337, an annular groove 335 defined in the outer wall 337, and a ring-shaped flange 333 formed on an inner surface of the bearing cone 33. A plurality of mounting holes 3311 are defined in the mounting end surface 331. The flange 333 includes a resisting surface 3331 facing alongside and being parallel to the mounting end surface 331.

The outer ring 35 is substantially ring shaped, and includes a cylindrical inner wall 351. A cone-shaped receiving chamber (not labeled) is formed on one end of the outer ring 35, and the outer ring 35 has a cone-shaped second inclined inner surface 353 connecting with the cylindrical inner wall 351.

Figure 5:
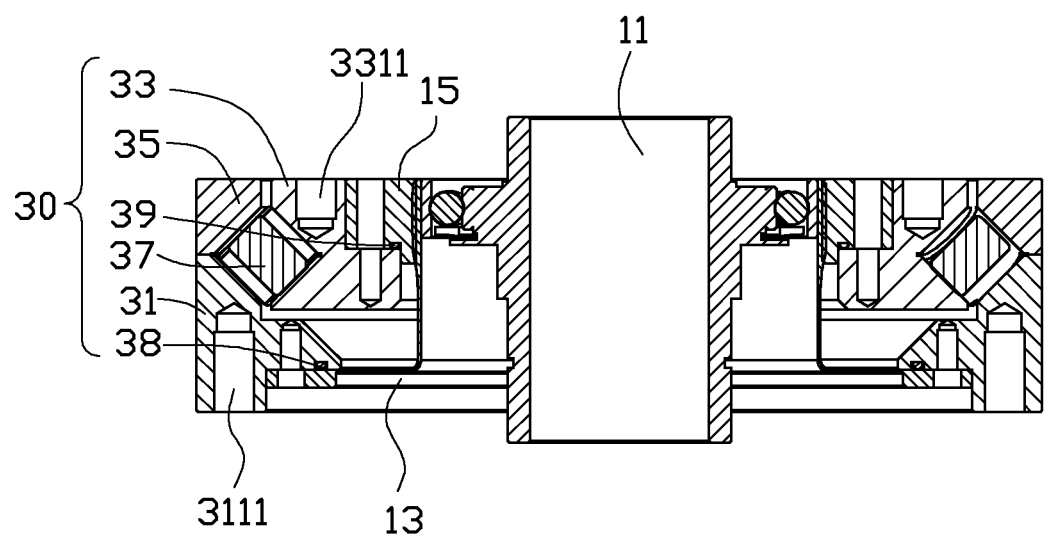
FIG. 5 shows a cross sectional view of the speed reducing mechanism, taken along line V-V of FIG. 2.

Also referring to FIG. 5, when assembling the speed reducing mechanism 100, the first sealing ring 38 is firstly put into and received within the bearing cup 31 from the assembling surface 311 end, and further abuts the first latching surface 3131 of the bearing cup 31. Then, the main body 131 of the first transmission member 13 passes through the bearing cup 31, and is fixed to the latching protrusion 313 of the bearing cup 31 by means of some fasteners (not labeled). The flange 133 of the first transmission member 13 is received within the bearing cup 31 and resisted against the corresponding first sealing ring 38, such that, the first sealing ring 38 forms a hermetic seal between the first transmission member 13 and the bearing cup 31. The rollers 37 are put into the annular groove 335 of the bearing cone 33, thereby are surrounding the bearing cone 33, and positioned adjacent to each other.

The rolling axis of every roller 37 is perpendicular to its neighboring roller 37. After that, the assembled bearing cone 33 is put into the bearing cup 31 and sleeved on the main body 131 of the first transmission member 13. The engaging end surface 339 of the bearing cone 33 abuts the corresponding second latching surface 3133 of the bearing cup 31, and the rollers 37 correspondingly resist against the first inclined inner surface 315.

The second sealing ring 39 is put into and received within the bearing cone 33 from the mounting end surface 331 end. The second sealing ring 39 abuts the resisting surface 3331 of the flange 333 of the bearing cone 33. The second transmission member 15 is assembled into the bearing cone 33 and resists against the second sealing ring 39, and is further fixed to the flange 333 of the bearing cone 33 by means of some fasteners (not labeled). The second sealing ring 39 forms a hermetic seal between the second transmission member 15 and the flange 333 of the bearing cone 33. The driving member 11 is coaxially received within the main body 131 of the first transmission member 13, the cylindrical outer periphery 113 of the driving member 11 abuts the inner peripheral wall 1311 of the first transmission member 13. The outer ring 35 is finally sleeved on the bearing cone 33 to finish the assembly of the speed reducing mechanism 100. The cylindrical inner wall 351 of the outer ring 35 abuts the corresponding ring-shaped outer wall 337 of the bearing cone 33, and the second inclined inner surface 353 resists against the corresponding rollers 37 assembled within the bearing cone 33.

Also referring to FIG. 1, as in use, the speed reducing mechanism 100 is applied to the robot, the assembling surface 311 of the speed reducing mechanism 100 is fixedly connected with the second robotic arm 300 by means of some fasteners (not shown). The mounting end surface 331 of the speed reducing mechanism 100 is also fixedly connected with the first robotic arm 200 of the robot by means of some fasteners. The driving member 11 is driven to work, thereby driving the first transmission member 13 to rotate. The second transmission member 15 engages with the first transmission member 13 and reduces the output rotating speed transmitted from the first transmission member 13. And thus, the second robotic arm 300 connecting with the bearing cup 31 is driven to rotate at a preset and reduced rotating speed.

The speed reducing mechanism 100 has a simple structure with perfect performance Since the speed reducer 10 is assembled within the bearing 30, the first transmission member 13 is fixed with the bearing cup 31, the second transmission member 15 is fixed with the bearing cone 33, and the rollers 37 are assembled between the bearing cup 31 and the bearing cone 33, the whole size or dimensions of the speed reducing mechanism 100 is thereby decreased. In addition, the speed reducing mechanism 100 has a compact structure and high rigidity. The rollers 37 are roller bearings, and assembled between the bearing cup 31 and the bearing cone 33 so that half of all the rollers 37 have an orientation which is perpendicular to the other half, and every roller 37 of one orientation is adjacent to one roller 37 of the other orientation, the speed reducing mechanism 100 can withstand radial loads, axial loads, torque loads and loads from any other directions, thereby improving the service life of the speed reducing mechanism 100.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A speed reducing mechanism, comprising:
   a speed reducer comprising:
      a driving member;
      a first transmission member assembled to the driving member and defining a plurality of first engaging teeth; and
      a second transmission member defining a plurality of second engaging teeth having a different count from that of the first engaging teeth, and engaging with the first engaging teeth of the first transmission member; and
   a bearing sleeved on the speed reducer, the bearing comprising:
      a bearing cup sleeved on and fixed with the first transmission member;
      a bearing cone assembled within the bearing cup, the bearing cone sleeved on and fixed with the second transmission member, the bearing cone comprising a ring-shaped flange formed on an inner surface thereof, the flange comprising a resisting surface within the bearing cone, the resisting surface fixed with the second transmission member, and thus the second transmission member assembled within the bearing cone;
      a plurality of cylindrical rollers assembled between the bearing cup and the bearing cone, and surrounding the bearing cone, and the rolling axis of every cylindrical roller is perpendicular to its neighbor cylindrical roller; and
      an outer ring sleeved on the bearing cone, and located at a side of the bearing cup along an axial direction of the bearing cup.

2. The speed reducing mechanism of claim 1, wherein the speed reducer is a harmonic speed reducer assembled within the bearing.

3. The speed reducing mechanism of claim 1, wherein the driving member is a harmonic wave generator.

4. The speed reducing mechanism of claim 3, wherein the first transmission member is a flexspline, and is sleeved on the driving member; the second transmission member is a rigid circular spline engaging with the flexspline.

5. The speed reducing mechanism of claim 4, wherein the bearing cup comprises a ring shaped latching protrusion formed on an inner surface thereof and a first inclined inner surface formed adjacent to one end thereof and positioned adjacent to the latching protrusion; the bearing cone is assembled within the bearing cup and comprises an engaging end surface resisting against the latching protrusion, a ring-shaped outer wall and an annular groove defined in the outer wall; the rollers are cylindrical and assembled into the annular groove of the bearing cone and resist against the first inclined inner surface of the bearing cup.

6. The speed reducing mechanism of claim 5, wherein, the outer ring comprises a cylindrical inner wall and a cone-shaped receiving chamber formed on one end of the outer ring, and having a cone-shaped second inclined inner surface; the second inclined inner surface resists against the rollers.

7. The speed reducing mechanism of claim 5, wherein, the speed reducing mechanism further comprises a first sealing ring and a second sealing ring, the first sealing ring is assembled within the bearing cup and sandwiched between the first transmission member and the latching protrusion of the bearing cup; the second sealing ring is assembled within the bearing cone together with the second transmission member and sandwiched between the flange and the second transmission member.

8. The speed reducing mechanism of claim 7, wherein the driving member has a cylindrical outer periphery, the first transmission member comprises a hollow cylindrical main body, the main body having an inner peripheral wall, and a flange coaxially formed on one end of the main body, the main body includes an inner peripheral wall; the driving member is coaxially received within the main body of the first transmission member, the cylindrical outer periphery abuts the inner peripheral wall of the first transmission member.

9. A speed reducing mechanism, comprising:
a speed reducer comprising:
   a driving member;
   a first transmission member assembled to the driving member and defining a plurality of first engaging teeth; and
   a second transmission member defining a plurality of second engaging teeth having a different count as that of the first engaging teeth, and engaging with the first engaging teeth of the first transmission member; and
a bearing sleeved on and engaging with the speed reducer, the bearing comprising:
   a bearing cup sleeved on and fixed with the first transmission member and comprising a latching protrusion formed on an inner surface thereof and a first inclined inner surface formed adjacent to one end thereof;
   a bearing cone assembled within the bearing cup, the bearing cone sleeved on and fixed with the second transmission member, the bearing cone comprising an engaging end surface resisting against the latching protrusion and an annular groove defined in an outer wall thereof, the bearing cone comprising a ring-shaped flange formed on an inner surface thereof, the flange comprising a resisting surface within the bearing cone, the resisting surface fixed with the second transmission member, and thus the second transmission member assembled within the bearing cone; and
   a plurality of cylindrical rollers assembled between the bearing cup and the bearing cone; the rollers are assembled within the annular groove of the bearing cone and resisting against the first inclined inner surface of the bearing cup; and
   an outer ring sleeved on the bearing cone, and located at a side of the bearing cup along an axial direction of the bearing cup.

10. The speed reducing mechanism of claim 9 wherein the speed reducer is a harmonic speed reducer assembled within the bearing, and the driving member is a harmonic wave generator.

11. The speed reducing mechanism of claim 9, wherein the first transmission member is a flexspline, and is sleeved on the driving member; the second transmission member is a rigid circular spline engaging with the flexspline.

12. The speed reducing mechanism of claim 11, wherein the rolling axis of every roller is perpendicular to its neighboring roller.

13. The speed reducing mechanism of claim 12, wherein the outer ring comprises a cylindrical inner wall and a cone-shaped receiving chamber formed on one end of the outer ring, and having a cone-shaped second inclined inner surface; the second inclined inner surface resists against the rollers.

14. The speed reducing mechanism of claim 13, wherein the speed reducing mechanism further comprises a first sealing ring and a second sealing ring, the first sealing ring is assembled within the bearing cup and sandwiched between the first transmission member and the latching protrusion of the bearing cup; the second sealing ring is assembled within the bearing cone together with the second transmission member and sandwiched between the flange and the second transmission member.

15. The speed reducing mechanism of claim 14, wherein the driving member has a cylindrical outer periphery, the first transmission member comprises a hollow cylindrical main body, the main body having an inner peripheral wall, and a flange coaxially formed on one end of the main body, the main body includes an inner peripheral wall; the driving member is coaxially received within the main body of the first transmission member, the cylindrical outer periphery abuts the inner peripheral wall of the first transmission member.

* * * * *